United States Patent [19]

Barkhoudarian

[11] Patent Number: 5,349,183
[45] Date of Patent: Sep. 20, 1994

[54] DIFFRACTION GRATING ROTARY SPEED SENSOR HAVING A CIRCUMFERENTIALLY VARIABLE PITCH DIFFRACTION GRATING

[75] Inventor: Sarkis Barkhoudarian, Canoga Park, Calif.

[73] Assignee: Rockwell International Corporation, Seal Beach, Calif.

[21] Appl. No.: 89,468

[22] Filed: Jul. 12, 1993

[51] Int. Cl.$^5$ .............................................. G01D 5/34
[52] U.S. Cl. ........................... 250/231.13; 356/354; 250/237 G
[58] Field of Search ............. 250/231.13, 231.16, 250/231.18, 236, 237 G; 359/572, 573; 356/356, 354; 369/44.11, 44.41, 44.23; 73/705

[56] References Cited

U.S. PATENT DOCUMENTS

| | | | |
|---|---|---|---|
| 4,650,995 | 3/1987 | Tokunaga et al. | 250/231.13 |
| 4,804,266 | 2/1989 | Barshad | 356/308 |
| 4,868,385 | 9/1989 | Nishimura | 250/231.16 |
| 4,874,245 | 10/1989 | Spillman, Jr. et al. | 356/364 |
| 4,874,941 | 10/1989 | Spillman, Jr. | 250/237 G |
| 5,104,225 | 4/1992 | Masreliez | 250/237 G |

*Primary Examiner*—David C. Nelms
*Assistant Examiner*—Que T. Le
*Attorney, Agent, or Firm*—H. Fredrick Hamann; Harry B. Field; Steven E. Kahm

[57] ABSTRACT

Optical measuring devises for measuring the angular position and rotation rate of a shaft 14. The shaft 14 has a variable pitch diffraction grating 22 etched on one end 16. The pitch gradient of the diffraction grating 22 varies as a function of circumferential position on the shaft 14. A monochromatic light source such as laser source 50 provides incident beam 20 which strikes grating 22. A diffracted light beam 26 from a the grating 22 strikes a position detector 61 at varying positions depending on the angular position of the shaft 14. By employing a position detector 61 which is sensitive to the position of the diffracted beam 26, a continuous position indicator of the shaft angular rotation is possible. A microprocessor calculates shaft position and rotation rates from the data supplied from the beam position detectors.

6 Claims, 5 Drawing Sheets

DIFFRACTION GRATING ROTARY SPEED SENSOR HAVING A CIRCUMFERENTIALLY VARIABLE PITCH DIFFRACTION GRATING

BACKGROUND OF THE INVENTION

1. Field of the Invention

This invention relates to devices for measuring the rotation and angular position of a shaft and more particularly to devices which use optical means for measuring the rate of rotation.

2. Description of the Related Art

In the past many methods were used to detect the rate of rotation of a shaft. Mechanical means have been used extensively. In more recent years electronic means such as a magnetic implant in a shaft and a magnetic field detector adjacent the shaft to detect the passing magnetic field have been used. These electronic means for measuring the speed of the shaft are subject to electromagnetic interference which reduces the reliability of the device. Optical means for measuring the speed of a rotor are not subject to electromagnetic interference. In the past optical means for measuring the speed of a rotor have included a means to polarize light as a function of shaft rotation position and a diffraction grating where light of a specific frequency reflected from the grating is detected indicating an angular position in the rotation of the wheel.

Many types of rotary measurement devices experience errors in the readings due to temperature fluctuations, light amplitude fluctuations and slippage or creep of the devices measurement elements.

SUMMARY OF THE INVENTION

This invention measures the rotation rate and angular position of a shaft by measuring the angle of diffraction of light from a diffraction grating placed at the end of a rotating shaft. The diffraction grating has a variable pitch as a function of distance around the circumference of the shaft so that the device can measure the angular position of the shaft continuously as it rotates and also count the number of revolutions made and the rate at which it is turning. By using a diffraction grating etched into the shaft no slippage or creep will be experienced. Since light is used to measure the rate at which the shaft turns no electromagnetic interference is encountered. The device is not affected by temperature changes or light amplitude variations because a reflected beam is used as a reference to compensate for these factors.

The device comprises a shaft having a diffraction grating which varies in pitch as a function of circumferential position. A monochromatic light source incident on the diffraction grating yields a reflected beam with a constant angle of reflection and a diffracted beam which varies as a function of angular position around the shaft's circumference. Linear position detectors detect the position of the reflected and diffracted beams creating signals which are a function of the position of the beams on the position detectors. There is a means, such as a microprocessor, for analyzing the signals from the position detectors and computing the angular position and rotation rate of the shaft.

OBJECTS OF THE INVENTION

Therefore it is an object of the present invention to provide 360° rotary speed measurement of a rotating shaft.

A further object of the present invention to provide 360° rotary position measurement of a rotating shaft.

Another object of the present invention to provide 360° rotary acceleration measurement of a rotating shaft.

Yet another object of the present invention to provide a device which operates in a manner immune from electromagnetic interference.

It is also an object of the present invention to provide a device for measuring the rotary speed of a shaft which is independent of light source amplitude fluctuations.

It is a further object of the present invention to provide a measuring system which works with any source of monochromatic light.

Still another object of the present invention to provide accurate measurements of rotary shaft speed free of slippage or creep of device elements and free from variations of temperature which can affect some devices.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1:
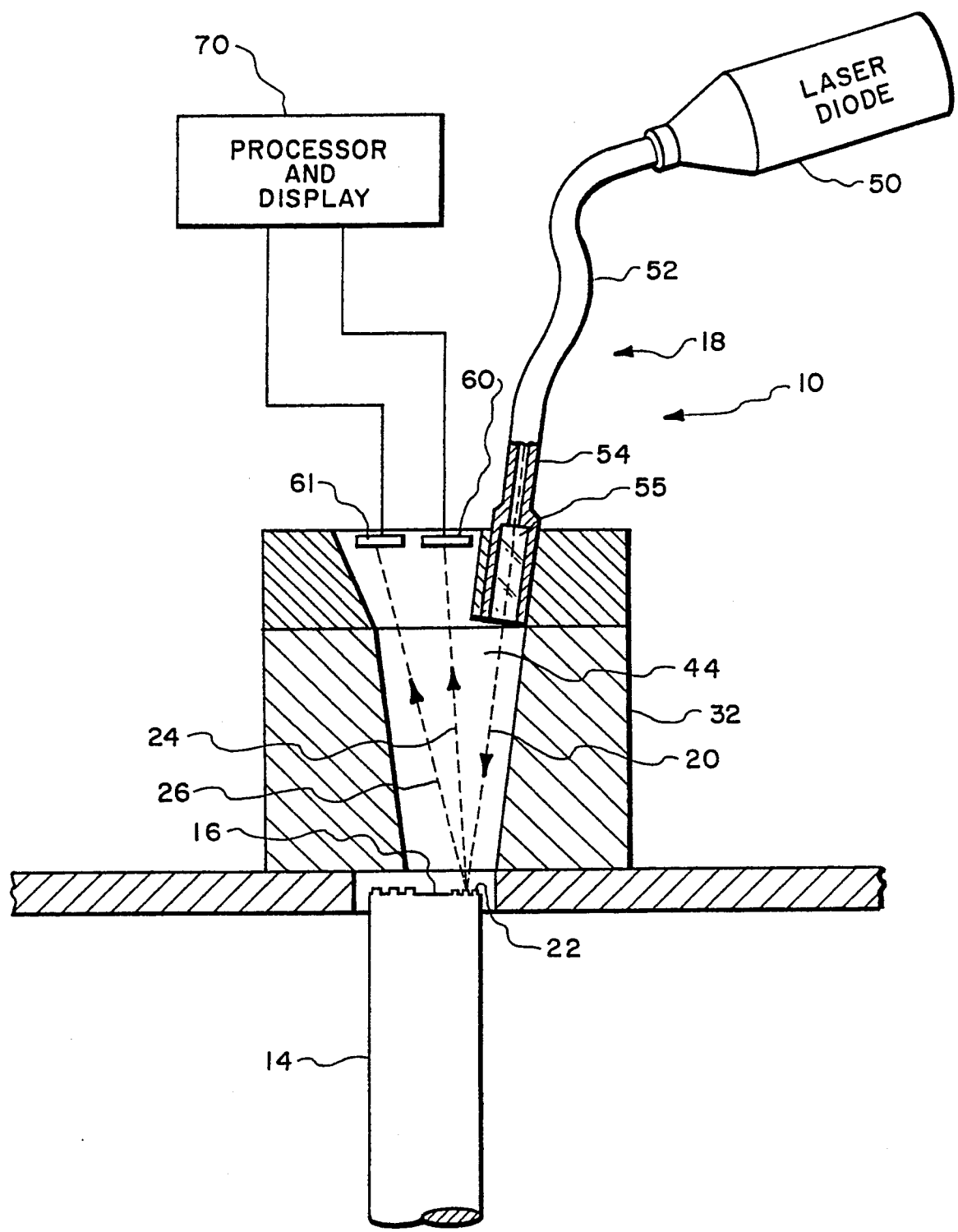
FIG. 1 is a schematic view of the preferred embodiment of the present invention wherein the optical housing and the elements shown therein are shown in cross-section.
Figure 2:
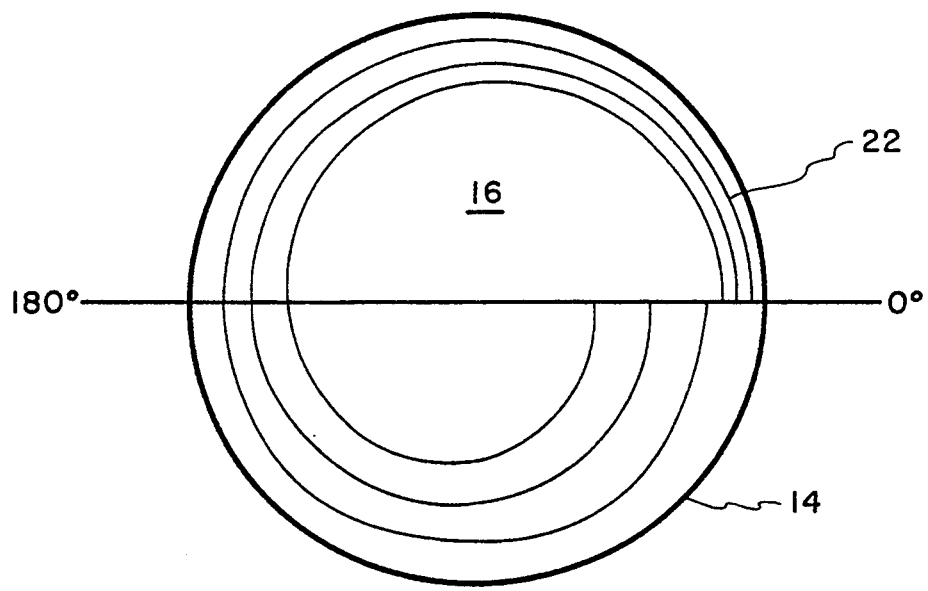
FIG. 2 is a top view of a shaft having a variable pitch diffraction grating around its circumference.

Referring to FIG. 1, the present invention provides an optical rotary speed sensor generally designated 10 for continuously measuring the speed of a shaft 14, or any other rotating object. The sensor 10 comprises a circumferentially varying diffraction grating 22 on the end surface 16 of shaft 14. FIG. 2 shows in exaggerated detail the circumferentially varying diffraction grating 22. The diffraction grating 22 has a pitch which is at a minimum at 0° and increases circumferentially to a maximum at 360°.

The means generally designated 18 for directing incident laser beam 20 to strike the diffraction grating 22 preferably comprises a laser diode 50 and an optical fiber 52 for directing incident laser beam 20 from a laser diode 50 into the internal chamber 44 of housing 32. Optical fiber 52 can be fixedly secured to housing 32 by means of a sleeve 54 preferably located through a portion of housing 32. Secured within sleeve 54 is a collimator lens 55. By such an arrangement, incident laser beam 20 is directed to strike the diffraction grating 22 at a known angle. The resultant reflected beam 24 and diffracted beam 26 are detected by position detectors 60 and 61 respectively. Position detectors 60 and 61 detect the position of the beam. The output voltage of the position detectors 60, 61 varies, preferably linearly, with the position of beams 24, 26 on the position detectors 60, 61. Therefore, when a beam is diffracted more or less by a diffraction grating the beams position changes on the position detector, yielding a position sensitive signal. This arrangement gives information on the angular position of the shaft continuously as the shaft rotates.

Position detectors 60, 61 can be a linear photodiode position detectors such as part number SD-386-22-21-251 made by Silicon Detector Corporation, 856 Lawrence Dr., Newbury Park, Calif. 91320 or an analog linear position detector such as part numbers CCD122 and CCD142 made by Fairchild Camera and Instrument Corporation, 464 Ellis Street, Mountain View, Calif. 94042. Each of these position detectors has the ability to provide a voltage output linearly proportional to the position of the beam on the position detector.

Figure 3:
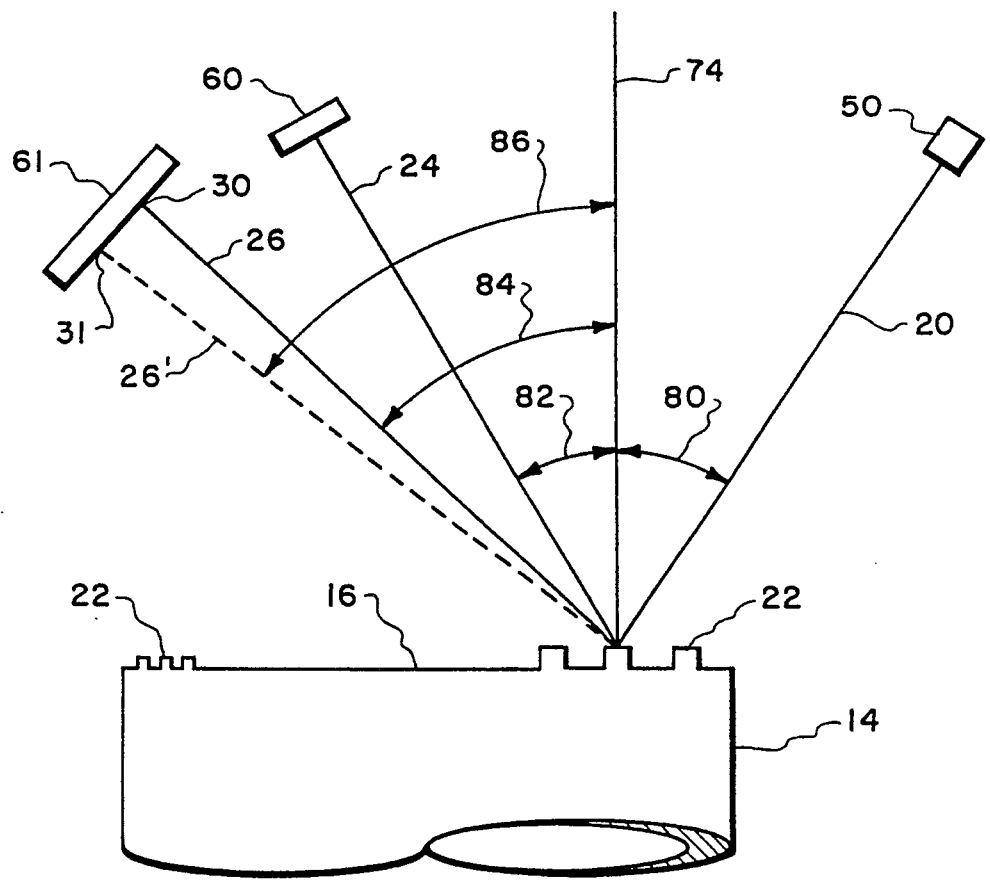
FIG. 3 is a cross-section view of the diffraction grating on the shaft end and also showing the laser source, the incident beam, the reflected beam, the diffracted beam, and the position detectors.

As FIG. 3 shows shaft 14 having end surface 16 including variable pitch diffraction grating 22 etched onto or in some other way attached to shaft end 16. Laser 50 generates beam 20 which is incident on grating 22 at a known incident angle 80 from the normal 74 to the surface of shaft end 16. With respect to the normal 74, incident angle 80 is equal to the reflected angle 82. Therefore, the angle of incidence for beam 20 is equal to the angle of reflection for reflected beam 24. Reflected beam 24 is incident on position detector 60, which measures the reflected beam 24 position on the position detector 60 as a function of voltage in the position detector's output. Similarly the diffracted beam 26 is detected by position detector 61 as a function of position. The diffracted beam 26 will change position on the position detector 61 as the shaft 14 rotates and the incident laser beam 20 is diffracted by a portion of the diffraction grating 22 with a different pitch. Thus at time t diffracted beam 26 is diffracted at angle 84 to position 30 on position detector 61 which yields a voltage of V. At time $t_1$ diffracted beam 26' is diffracted at angle 86 to position 31 on position detector 61 which yields a voltage of $V_1$.

The voltages from the position detectors are sent to a microprocessor 70, or to analog circuits for processing into rotary speed data which is displayed on a monitor.

Figure 4:
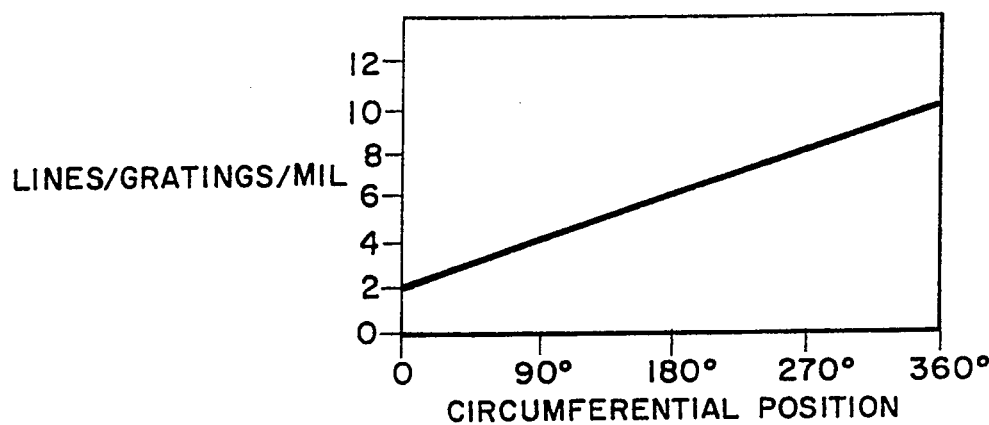
FIG. 4 is a graph of the lines per rail in the grating plotted against their circumferential position.
Figure 5:
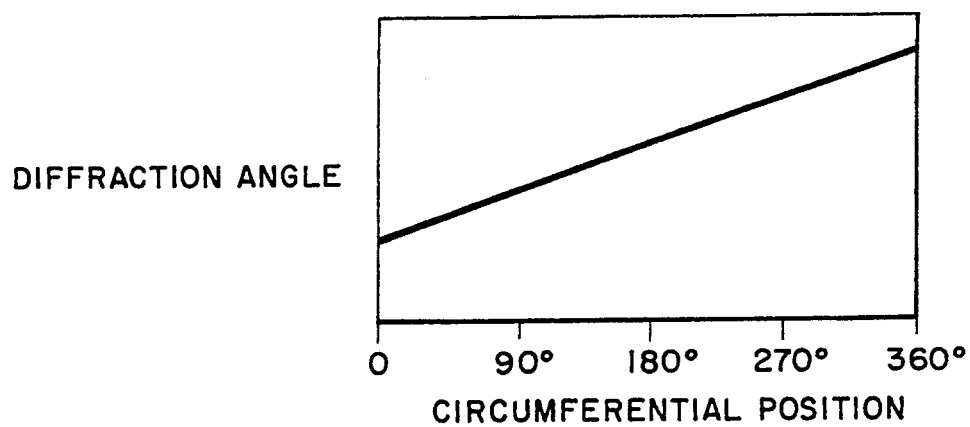
FIG. 5 is a graph of the diffraction angle of the light diffracted by the grating plotted against the circumferential position of the shaft.
Figure 6:
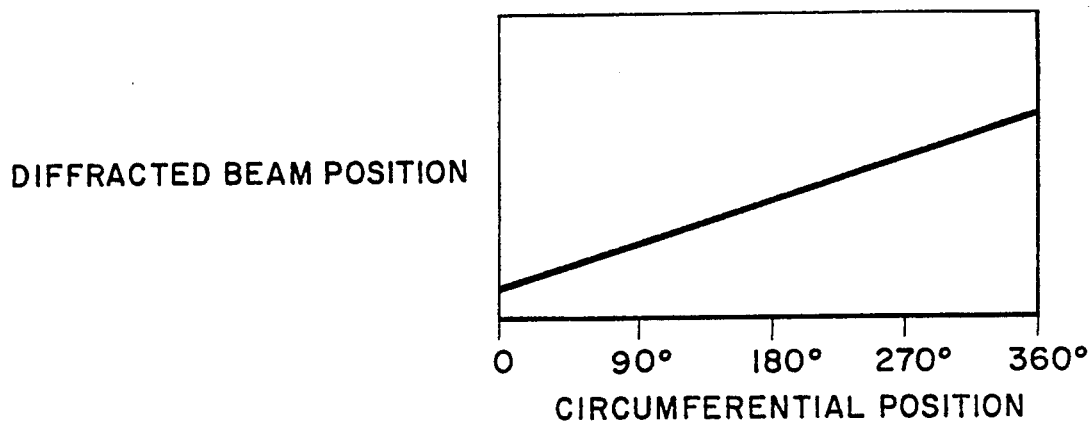
FIG. 6 is a graph of the diffracted beam and the reflected beam plotted against the circumferential position of the shaft.

As is shown in FIG. 2 the diffraction grating lines per mil increases as a function of circumferential position. The graph in FIG. 4 indicates that the number of lines per mil increases linearly from 2° at 0° to 10° at 360°. The graph in FIG. 5 shows that the angle of the diffracted beam 26 increases with the circumferential position of the beam 20 on diffraction grating 22. The graph in FIG. 6 shows the diffracted beam position on the position detector changes linearly as the circumferential position of the shaft changes.

As shown in the FIGURES the reflected beam's angle 82 and position remains constant as a function of circumferential position.

Figure 7:
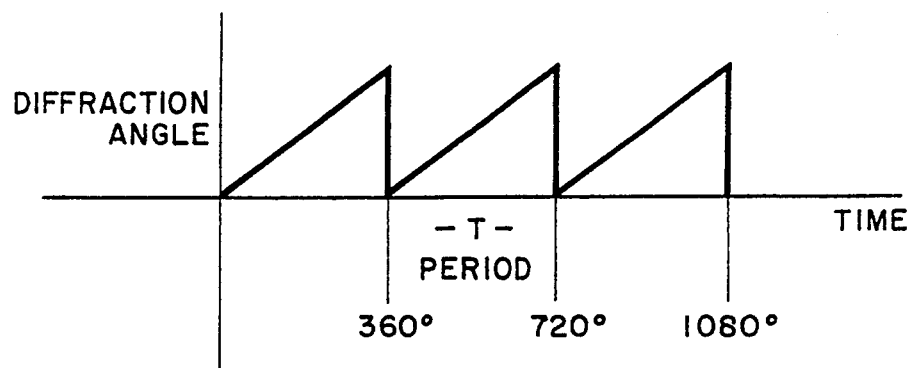
FIG. 7 is a graph of the diffraction angle of a rotating shaft plotted against time.

Since the diffracted beam 26 changes position on the position detector 61 as a function of circumferential position and yields a voltage related to that position, a rotating shaft 14 will display a graph as shown in FIG. 7 where the period of shaft 14 is T. The number revolutions per second and the angular position of the shaft are easily determined from the voltage readings from position sensor 61 which measures the diffracted beam 26.

The diffracted beam 26 can be the first order diffracted beam or any other order.

In the preferred embodiment the reflected beam 24 which is angularly constant is used to give a reference beam to account for variations in incident beam intensity, reflective surface coefficients, vibrations and other variables. A comparative ratio between the constant reflected beam and the variable diffracted beam is used as the output signal which should be free from variables in beam strength and position.

Figure 9:
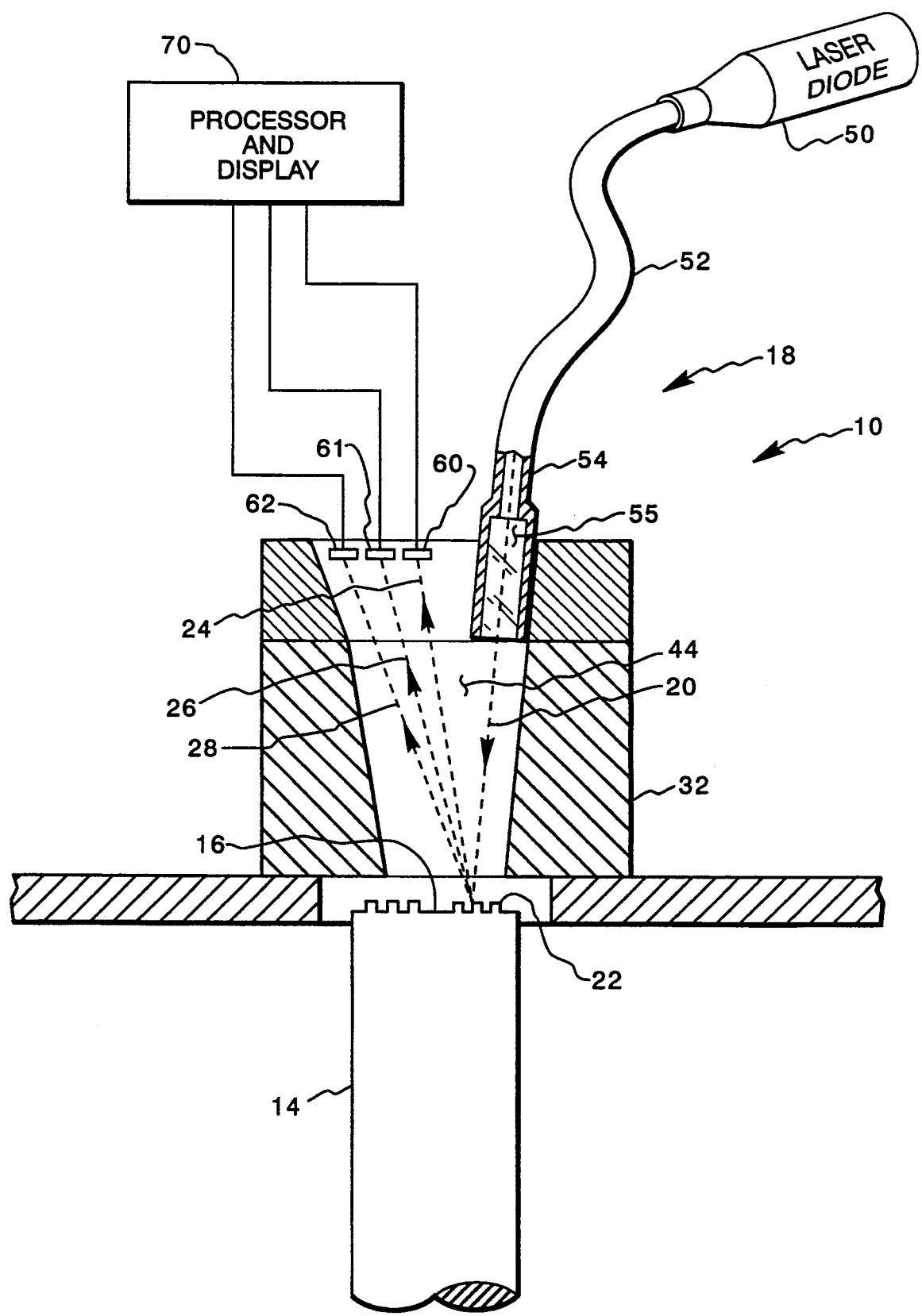
FIG. 9 is an embodiment of the invention with three position detectors.

For further improvements in output signal quality a third position detector 62, may be used in conjunction with a diffracted beam 28, from another order, as shown in FIG. 9, to further use as comparison in computing an output signal.

Equipment for use in the invention and circuits for analog combining of the reflected beam signal and the diffracted beam signal are disclosed in the applicant's U.S. Pat. No. 4,620,093 which is hereby made a part hereof and incorporated herein by reference.

Figure 8:
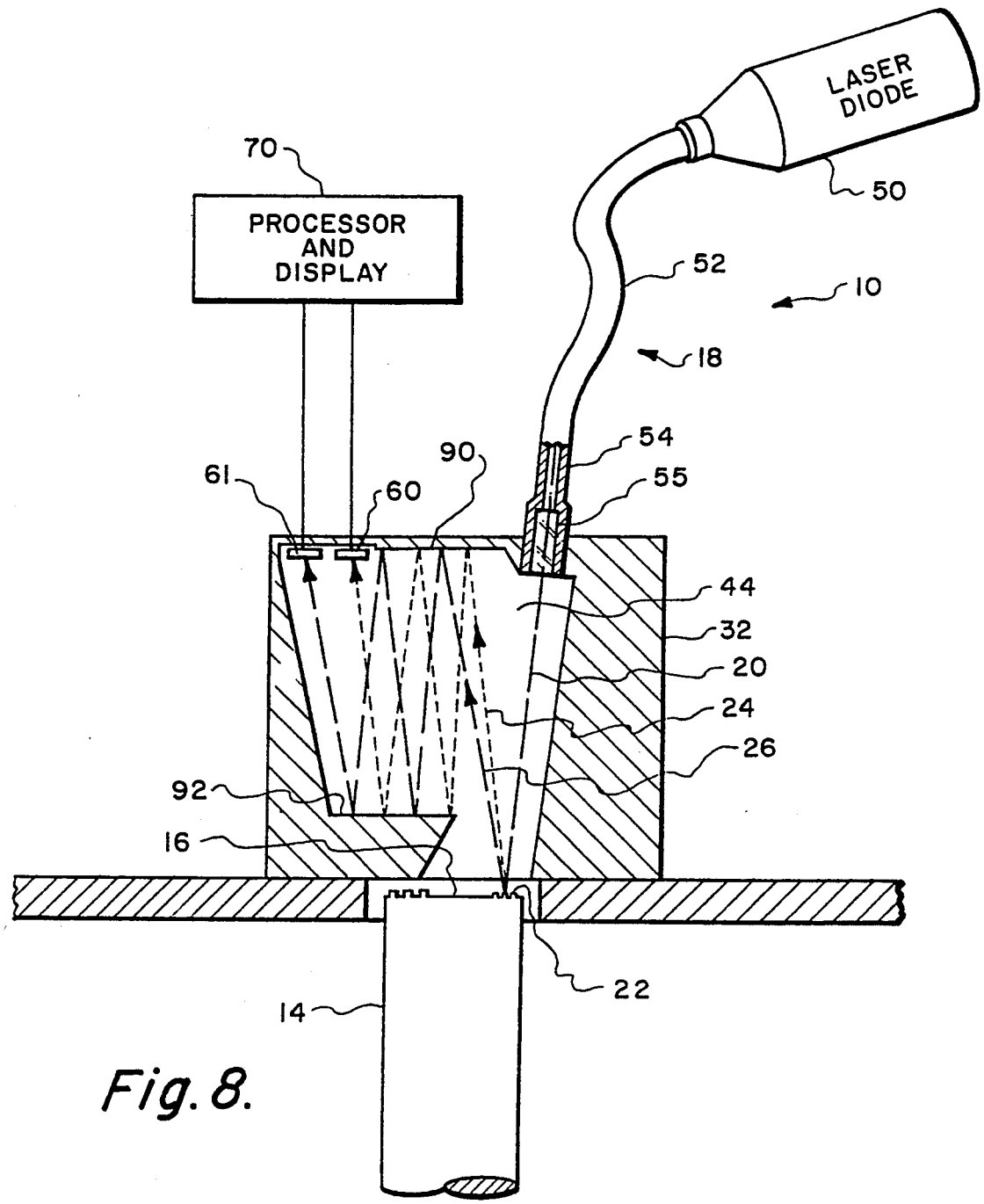
FIG. 8 is a second embodiment of the invention wherein mirrors are employed to lengthen the distance between the diffraction grating and the position detectors to enhance its sensitivity.

In another embodiment of the invention as shown in FIG. 8, reflective surfaces 90 and 92 may be used to lengthen the beam path from the diffraction grating 22 to the position detectors 60 and 61.

In a further embodiment the reference reflected beam 24 is not used. The diffracted beam's relative position on the position detector is all that is required to give information about the shaft's angular position and rate of rotation. In this embodiment diffraction beam 26 strikes position detector 61 as a function of the angular position of shaft 14. The position detector signal is proportional to the angular position of the shaft 14.

It should be noted that the device disclosed herein will function with any source of monochromatic light. Therefore the laser as disclosed above may be replaced with a light emitting diode, or any source of light filtered to be monochromatic.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A diffraction grating rotary speed sensor, comprising:
   a circumferentially variable pitch diffraction grating on a rotating object;
   means for generating a monochromatic light beam which is incident on the diffraction grating at a constant angle, for producing a first diffracted beam having a first diffraction angle which varies as a function of the pitch on the diffraction grating as the object rotates;
   a first position detector which generates signals which vary with the position of an incident beam, wherein the first diffracted beam is incident on the first position detector, which yields a signal proportional to the position of the first diffracted beam on the first position detector;

a means for calculating the angular position and rate of rotation of the object from the first position detector signals.

2. A diffraction grating rotary speed sensor as in claim 1, further comprising:
the means for generating a monochromatic light beam produces a reflected beam when incident on the diffraction grating, which has a constant angle of reflection as a function of the pitch on the diffraction grating as the object rotates;
a second position detector which generates signals which vary with the position of an incident beam, wherein the reflected beam is incident on the second position detector, which yields a signal proportional to the position of the reflected beam on the second position detector;
means of comparing the reflected beam signal and the diffracted beam signal to enhance the accuracy of the sensor.

3. A diffraction grating rotary speed sensor as in claim 2, further comprising:
the means for generating a monochromatic light beam which is incident on the diffraction grating at a constant angle, producing a second diffracted beam having a second diffraction angle which varies as a function of the pitch on the diffraction grating as the shaft rotates;
a third position detector which generates signals which vary with the position of an incident beam, wherein the second diffracted beam is incident on the third position detector, which yields a signal proportional to the position of the beam on the third position detector;
means of comparing the reflected beam signal and the diffracted beam signals to enhance the accuracy of the sensor.

4. A diffraction grating rotary speed sensor as in claim 3, further comprising:
a reflective surface for reflecting the diffracted beams and the reflected beam to increase the path length between the diffraction grating and the position detectors thereby enhancing the resolution of the sensor.

5. A diffraction grating rotary speed sensor as in claim 2, further comprising:
a reflective surface for reflecting the diffracted beam and the reflected beam to increase the path length between the diffraction grating and the position detectors thereby enhancing the resolution of the sensor.

6. A diffraction grating rotary speed sensor as in claim 1, further comprising:
a reflective surface for reflecting the diffracted beam to increase the path length between the diffraction grating and the position detector thereby enhancing the resolution of the sensor.

* * * * *